(12) United States Patent
Haehner et al.

(10) Patent No.: US 8,201,414 B2
(45) Date of Patent: Jun. 19, 2012

(54) ASSISTANCE DEVICE FOR TRANSIENT ACCELERATION AND DECELERATION PHASES

(75) Inventors: Edgar Haehner, Bordes (FR); Gerald Senger, Morlaas-Berlanne (FR)

(73) Assignee: Turbomeca, Bordes (FR)

( * ) Notice: Subject to any disclaimer, the term of this patent is extended or adjusted under 35 U.S.C. 154(b) by 366 days.

(21) Appl. No.: 12/594,826

(22) PCT Filed: Apr. 4, 2008

(86) PCT No.: PCT/FR2008/050601
§ 371 (c)(1),
(2), (4) Date: Oct. 6, 2009

(87) PCT Pub. No.: WO2008/139096
PCT Pub. Date: Nov. 20, 2008

(65) Prior Publication Data
US 2010/0058731 A1    Mar. 11, 2010

(30) Foreign Application Priority Data

Apr. 6, 2007    (FR) ..................................... 07 54346

(51) Int. Cl.
*F02C 7/275* (2006.01)
(52) U.S. Cl. ........................................................ 60/788
(58) Field of Classification Search ................. 60/39.12, 60/786–788, 802; 290/4 R; 180/54.1
See application file for complete search history.

(56) References Cited

U.S. PATENT DOCUMENTS

| 4,062,185 | A | | 12/1977 | Snow |
| 4,927,329 | A | * | 5/1990 | Kliman et al. ................ 416/127 |
| 5,929,537 | A | | 7/1999 | Glennon |
| 6,107,693 | A | * | 8/2000 | Mongia et al. .................. 290/52 |
| 6,145,296 | A | | 11/2000 | Rakhmailov |
| 6,313,544 | B1 | * | 11/2001 | Mongia et al. .................. 290/52 |
| 6,931,856 | B2 | * | 8/2005 | Belokon et al. ................. 60/772 |
| 7,188,475 | B2 | * | 3/2007 | McGinley et al. .............. 60/726 |
| 7,802,757 | B2 | * | 9/2010 | Dooley et al. ................... 244/60 |
| 7,926,287 | B2 | * | 4/2011 | Ullyott et al. ................... 60/776 |
| 7,942,079 | B2 | * | 5/2011 | Russ ............................... 74/664 |
| 2002/0158517 | A1 | * | 10/2002 | Rouse et al. .................... 307/151 |
| 2004/0066175 | A1 | | 4/2004 | Gupta et al. |
| 2004/0160061 | A1 | * | 8/2004 | Rouse et al. .................... 290/52 |
| 2005/0056021 | A1 | | 3/2005 | Belokon et al. |
| 2006/0066112 | A1 | | 3/2006 | Geis et al. |
| 2006/0225431 | A1 | | 10/2006 | Kupratis |
| 2007/0137216 | A1 | * | 6/2007 | Joshi et al. ...................... 60/791 |
| 2007/0256421 | A1 | | 11/2007 | Dooley |

FOREIGN PATENT DOCUMENTS

| EP | 1 712 761 | 10/2006 |
| EP | 1 852 574 | 11/2007 |
| FR | 1 530 430 | 6/1968 |
| WO | 00 20738 | 4/2000 |

* cited by examiner

*Primary Examiner* — Louis Casaregola
*Assistant Examiner* — Phutthiwat Wongwian
(74) *Attorney, Agent, or Firm* — Oblon, Spivak, McClelland, Maier & Neustadt, L.L.P.

(57) ABSTRACT

A turbine engine for a helicopter, including a gas generator and a free turbine driven in rotation by the gas flow generated by the gas generator is disclosed. The turbine engine further includes a motor/generator coupled to a shaft of the gas generator, to provide a quantity of additional rotational kinetic energy to the shaft during a stage of turbine engine acceleration, or to draw a quantity of rotational kinetic energy from the shaft during a stage of turbine engine deceleration.

8 Claims, 1 Drawing Sheet

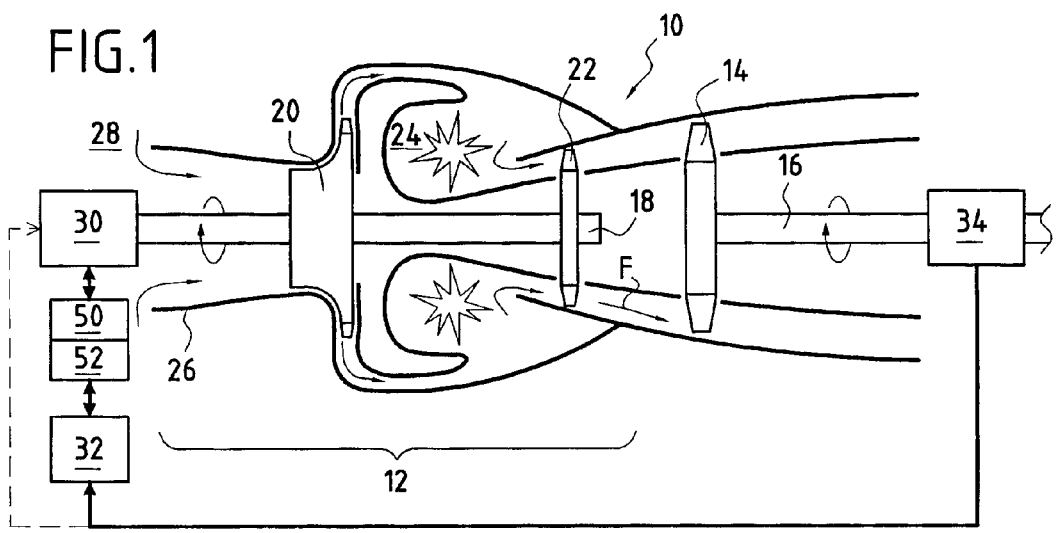
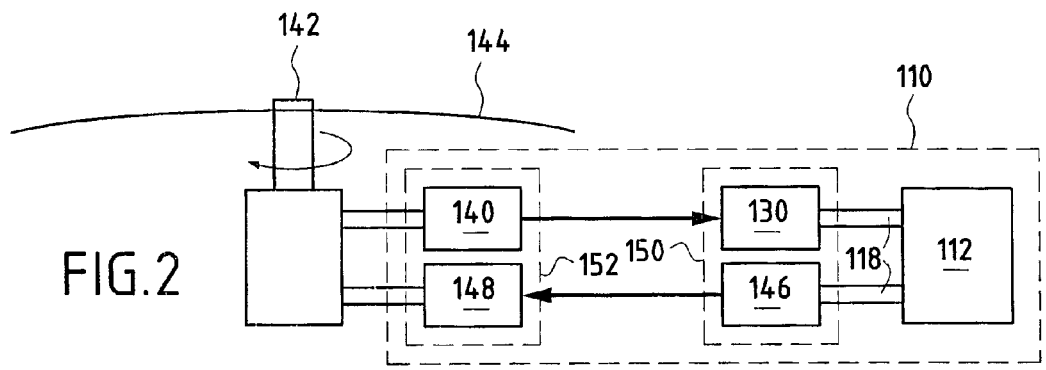
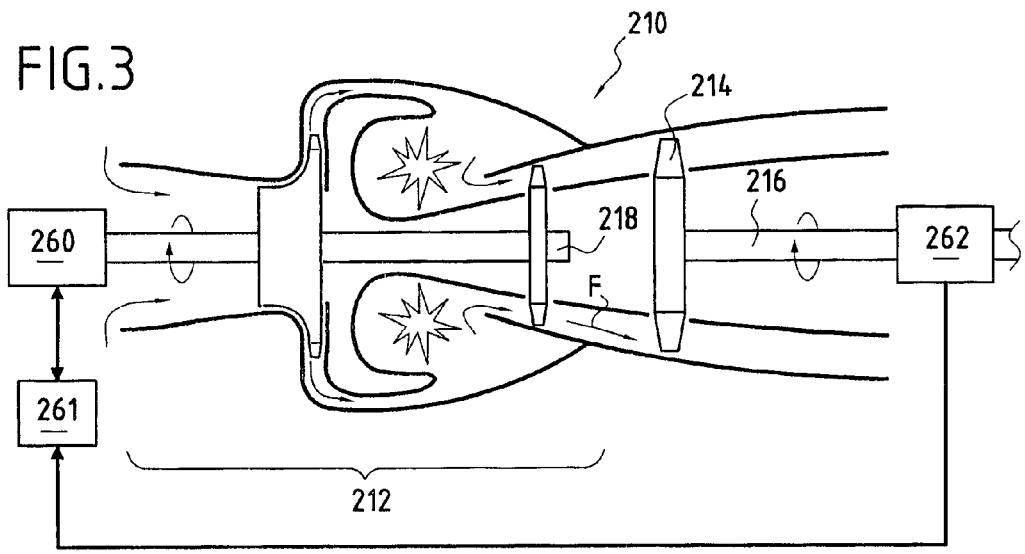

ASSISTANCE DEVICE FOR TRANSIENT ACCELERATION AND DECELERATION PHASES

BACKGROUND OF THE INVENTION

1. Field of the Invention

The present invention relates to the field of gas turbines, and particularly to the field of turbine engines for aircraft such as helicopters.

The present invention relates more particularly to a turbine engine, in particular for a helicopter, the engine including a gas generator and a free turbine driven in rotation by the gas flow generated by the gas generator.

2. Description of the Related Art

Conventionally, the gas generator comprises at least one centrifugal compressor and a turbine that are coupled together in rotation. Operation is as follows: the cool air entering the turbine engine is compressed due to the rotation of the compressor before being sent to a combustion chamber in which it is mixed with a fuel. The burnt gas from the combustion is then exhausted at high speed towards the turbine of the gas generator.

A first expansion then takes place in the turbine of the gas generator, during which expansion said turbine extracts the energy necessary for driving the compressor.

The turbine of the gas generator does not absorb all of the energy of the burnt gas and the surplus energy constitutes the gas flow generated by the gas generator.

Said gas generator therefore provides kinetic energy to the free turbine so that a second expansion takes place in the free turbine which transforms the energy from the gas into rotational kinetic energy in order to drive a receiver unit, such as the rotor of the helicopter.

Naturally, the turbine engine is intended to operate within set limits, and the turbine engine is kept within such limits by acting mainly upon the flow rate of the fuel injected into the combustion chamber.

Thus, during a stage of turbine engine acceleration, in particular in flight, following a power demand from the pilot, the flow rate of the fuel injected into the combustion chamber is increased, and that has the effect of increasing the generated gas flow and consequently of increasing the power delivered to the free turbine.

However, acceleration must take place within certain limits in order to avoid the surge phenomenon that is damaging to the turbine engine. This phenomenon can take place during acceleration that is too sudden and during which, because of a fuel flow rate that is too high, the pressure downstream from the combustion chamber becomes higher than the pressure upstream, i.e. the pressure of the compressed air delivered by the compressor. Under such circumstances, the first expansion takes place not only downstream, but also upstream so that the flow rate of the burnt gas becomes zero and the pressure in the compressor drops.

It is well known that the surge phenomenon may have detrimental consequences on the parts constituting the turbine engine and on the power delivered by the turbine engine.

As a transient stage of acceleration requires a significant increase in the fuel flow rate, a margin (known as a surge margin) is generally provided that is large enough for the turbine engine to operate without surging in its operating range.

It can thus be understood that the acceleration capacity of such a turbine engine is limited by its surge margin.

BRIEF SUMMARY OF THE INVENTION

An object of the present invention is to provide a helicopter turbine engine that presents better acceleration capacity while having the same surge margin as a prior art turbine engine.

The invention achieves this object by the fact that it further includes an auxiliary motor coupled to a gas generator shaft, for delivering an additional quantity of rotational kinetic energy to the shaft during a stage of turbine engine acceleration.

The gas generator shaft is the shaft on which the compressor and the turbine are mounted.

In the meaning of the invention, the auxiliary motor is completely separate from the assembly constituted by the combustion chamber and the turbine(s) of the gas generator, i.e. the motor constitutes an element that is auxiliary to the gas generator.

Thus, by forming means for assisting the acceleration of the turbine engine, the auxiliary motor is suitable for delivering additional torque to the gas generator shaft during an acceleration stage, whereby the overall acceleration of the turbine engine is advantageously obtained by increasing the fuel flow rate and by the auxiliary motor delivering additional torque.

Advantageously, as a result of the presence of the auxiliary motor, there is less need to increase the fuel flow rate in order to accelerate the turbine engine, since the auxiliary motor delivers the extra acceleration.

It should therefore be understood that the turbine engine of the present invention presents a level of acceleration rate that is greater than that of a prior art turbine engine, while still having the same surge margin.

Alternatively, another advantage of the present invention is to be capable of designing turbine engines having smaller surge margins, thereby advantageously reducing turbine engine size.

It should also be understood that by means of the present invention, since the excess-flow rate of fuel necessary for acceleration is reduced, the temperature of the hot portions of the turbine engine is advantageously lower.

Finally, the turbine engine of the present invention is suitable for advantageously offering a constant level of acceleration whatever the altitude of the helicopter.

In a first embodiment, the auxiliary motor is an electric motor.

In a first variant, the auxiliary motor is powered by a battery.

In another advantageous variant, the electric motor is powered by a first electricity generator driven in rotation by the free turbine.

Under such circumstances, the electricity generator, which is suitable for transforming rotary motion into electricity, is dimensioned so as to draw only a small fraction of the torque on the shaft of the free turbine, the main portion of the torque naturally being intended to drive the helicopter rotor(s) in rotation.

The electricity generator may also be associated with a booster battery, if necessary.

In another advantageous variant, the electric motor is powered by a first electricity generator driven in rotation by a rotor of the helicopter.

To do this, the first electricity generator draws an amount of rotational kinetic energy from the rotor compared with the total rotational energy of the rotor, in order to transform it into electricity for powering the electric auxiliary motor coupled to the gas generator shaft.

The helicopter rotor acts as a flywheel of considerable inertia, such that drawing energy from the rotor does not significantly disturb the flight of the helicopter.

In another embodiment, the auxiliary motor is a hydraulic motor.

In addition, within the above-described context of prior art turbine engine operation, deceleration is performed by substantially reducing the fuel flow rate.

As with acceleration, deceleration must take place within certain limits.

A reduction of the fuel flow rate that is too sudden may lead to flame-out of the turbine engine, to such an extent that a flame-out margin is also provided for.

It should therefore be understood that in the prior art, the power delivered to the helicopter must not be reduced too quickly because of the risk of engine flame-out.

Another object of the invention is to provide a turbine engine offering better deceleration capacity.

The invention achieves this object by the fact that the turbine engine of the invention further includes deceleration assistance means, for drawing a quantity of rotational kinetic energy from the gas generator shaft during a stage of turbine engine deceleration.

These assistance means are auxiliary, i.e. they are separate from the assembly formed by the combustion chamber and the turbine of the gas generator.

Moreover, they contribute to decelerating the turbine engine by reducing the rotational energy of the gas generator shaft. In other words, they act as a kind of mechanical brake.

Thus, by means of the invention, it is possible to reduce the speed of rotation of the shaft of the generator more quickly without excessively reducing the fuel flow rate, i.e. without running the risk of the turbine engine stopping.

In advantageous manner, the deceleration assistance means include a second electricity generator connected to the gas generator shaft.

During a deceleration stage, the second electricity generator is activated so that it draws a fraction of the rotational energy of the gas generator shaft in order to transform it into electricity.

Preferably, but not necessarily, the deceleration assistance means further include a storage unit for storing the kinetic energy drawn by the electricity generator in the form of electricity.

Thus, the stored energy can be re-used by the helicopter's electrical devices and, in more particularly advantageous manner, by the auxiliary electric motor. In this example, the storage unit may advantageously constitute the battery of the auxiliary electric motor.

In other words, the energy stored by the storage unit during a deceleration stage may advantageously be used to power the auxiliary electric motor during an acceleration stage.

Advantageously, the deceleration assistance means further include a second motor connected to a rotor of the helicopter that is powered by the electricity generator so that the quantity of kinetic energy drawn by the electricity generator is stored in the form of rotational kinetic energy in the rotor of the helicopter.

Thus, during a deceleration stage, the electricity delivered by the second generator connected to the gas generator shaft is transformed into mechanical energy by the second motor that is coupled to the rotor, this mechanical energy being stored in the rotor acting as a flywheel.

Even more advantageously, the auxiliary motor is also capable of operating as an electricity generator so that the deceleration assistance means include said motor operating as a generator.

In another advantageous embodiment, the second motor connected to the rotor is also capable of operating as an electricity generator for powering the auxiliary motor connected to the gas generator shaft.

In another variant of the invention, the deceleration assistance means further include a hydraulic pump coupled to the gas generator shaft.

BRIEF DESCRIPTION OF THE SEVERAL VIEWS OF THE DRAWINGS

The invention can be better understood and its advantages appear more clearly on reading the following description of an embodiment given by way of non-limiting example. The description refers to the accompanying figures, in which:

FIG. 1 shows a helicopter turbine engine in accordance with the present invention, including an auxiliary motor coupled to the gas generator shaft in order to provide it with additional rotational kinetic energy.

FIG. 2 is a diagram showing a second embodiment of the invention in which the energy delivered to the gas generator shaft is drawn from the rotor, the energy drawn from the gas generator shaft can be stored in the rotor; and FIG. 3 shows a third embodiment of the invention in which the auxiliary motor is a hydraulic motor and in which the deceleration assistance means include a hydraulic pump.

DETAILED DESCRIPTION OF THE INVENTION

FIG. 1, is a diagram showing a turbine engine 10 constituting a first embodiment of the invention and intended in particular to drive a helicopter rotor (not shown) in rotation, the turbine engine 10 comprising a gas generator 12 and a free turbine 14 capable of being driven in rotation by a gas flow F generated by the gas generator 12.

The free turbine 14 is mounted on a shaft 16 that transmits the rotary motion to a receiver unit such as the main rotor of the helicopter.

The turbine engine 10 shown in FIG. 1 is of the rear take-off type. Without going beyond the ambit of the present invention, it is possible to consider a turbine engine with a free turbine of the front take-off type with transfer by an outer shaft, or a turbine engine with a free turbine of the front take-off type with transfer by a coaxial shaft.

The gas generator includes a rotary shaft 18 on which there are mounted a centrifugal compressor 20, a turbine 22, and a combustion chamber 24 placed axially between the compressor 20 and the turbine when the gas generator 12 is taken into consideration along the axis of the rotary shaft 18.

The turbine engine 10 presents a casing 26 provided with an air inlet 28 by which cool air enters the gas generator 12.

After entering the enclosure of the gas generator 12, the cool air is compressed by the centrifugal compressor 20 that delivers it to the entrance of the combustion chamber 24 in which it is mixed with fuel.

The combustion that takes place in the combustion chamber 24 causes burnt gas to be exhausted towards the turbine 22 at high speed, thereby having the effect of driving the shaft 18 of the gas generator 12 and consequently the centrifugal compressor 20 in rotation.

The speed of rotation of the shaft 18 of the gas generator 12 is determined by the flow rate of the fuel entering the combustion chamber 24.

In spite of kinetic energy being extracted by the turbine 22, the gas flow F from the gas generator presents a significant amount of energy.

As can be understood from FIG. 1, the gas flow F is directed towards the free turbine 14, thereby causing gas to expand in the free turbine 14, which leads to the turbine wheel and the shaft 16 being set into rotation.

In accordance with the invention, the turbine engine advantageously includes an auxiliary motor 30 coupled to one end of the shaft 18 of the gas generator 12.

In the first embodiment shown in FIG. 1, the auxiliary motor 30 is an electric motor powered by a storage unit 32, preferably of the type comprising a electric battery, a group of supercapacitors, or a combination of both.

During a stage of turbine engine acceleration, the motor 30 is actuated in such a manner as to advantageously provide additional rotational kinetic energy to the shaft 18 of the gas generator 12, the acceleration of the gas generator shaft being thus assisted by the auxiliary motor 30.

There then follows a more rapid increase in the speed of the shaft 18 of the gas generator and, consequently, a more rapid increase in the power available from the turbine 14 for accelerating the shaft 16 of the free turbine 14.

In a particularly advantageous manner, the additional torque delivered by the auxiliary motor 30 therefore makes it possible to increase the rate of acceleration of the rotor, consequently, the maneuverability of the helicopter is improved.

In advantageous manner, the electric motor 30 may also be powered by a first electricity generator 34 coupled to the shaft 16 of the free turbine 14.

Preferably, the first electricity generator 34 is also connected to the storage unit 32 in such a manner as to be capable of recharging said storage unit 32.

The turbine engine 10 shown in FIG. 1 further includes deceleration assistance means that are intended to draw a quantity of rotational kinetic energy from the shaft 18 of the gas generator 12 during a stage of turbine engine deceleration 10.

These deceleration means comprise a second electricity generator that is preferably, but not necessarily constituted by the electric motor 30.

Without going beyond the ambit of the present invention, provision could be made for the second generator to be in the form of a unit that is separate from the motor 30.

However, in the presently-described embodiment, the electric motor 30 is also suitable for use as a generator. This type of motor/generator is furthermore well known and is not described in detail.

For reasons of simplicity, the electric motor 30 that is capable of operating as a generator is referred to as a "motor/generator 30" in the rest of the detailed description.

When the motor/generator 30 operates as a generator, it draws a quantity of rotational kinetic energy from the shaft 18 of the gas generator 12 in order to transform it into electrical energy.

As a result, the rotational kinetic energy of the shaft 18 is reduced and consequently the shaft 18 of the gas generator 12 decelerates more quickly than conventionally, with deceleration being carried out solely by reducing the fuel flow rate.

In advantageous manner, the electrical energy produced by the motor/generator 30 is stored, preferably in the storage unit 32, in order to be re-used in particular during assisted acceleration by powering the motor/generator 30 operating in motor mode.

Preferably, a converter 50 and an electronic control device 52 are placed between the storage unit 32 and the motor/generator 30, in such a manner as to control the exchanges of electrical energy between the motor/generator 30 and the storage unit 32.

In advantageous manner, the motor/generator 30 is intended to start the gas generator (i.e. to drive it in rotation) while starting the turbine engine.

To summarize, as compared with known turbine engines, the turbine engine 10 of the first embodiment of the invention further comprises an electric motor/generator 30 that is electrically connected to a storage unit 32, while being mechanically coupled to a shaft 18 of the gas generator 12, the storage unit 32 being capable of powering the motor/generator during a stage of turbine engine acceleration in order to provide a quantity of additional rotational kinetic energy to the shaft 18, and also being capable of storing as electrical energy a quantity of kinetic energy drawn from the gas generator shaft 18 by the motor/generator 30 during a stage of turbine engine deceleration.

FIG. 2 is a diagram of a second embodiment of the turbine engine 110 of the invention. Elements that are the same as those in the first embodiment have the same numerical references plus 100.

In this second embodiment, the turbine engine 110 advantageously includes a first auxiliary electric motor 130 that is capable of delivering a quantity of additional energy to the shaft 118 of the gas generator 112.

The first electric motor 130 is advantageously powered by a first electricity generator 140 that is coupled to a shaft 142 of the rotor 144 of a helicopter in which the turbine engine 110, is mounted with the shaft 142 of the rotor 144 being coupled to the shaft of the free turbine of the turbine engine 110.

In other words, a quantity of rotational kinetic energy is drawn from the rotor 144 and transformed into electrical energy by means of the first electricity generator 140.

Obviously it is ensured that the quantity of energy that is drawn off is considerably less than the rotational kinetic energy of the rotor 144, and this does not pose any particular problems because of the high level of the kinetic energy of the rotor.

Thus, in the invention, during a stage of turbine engine acceleration, energy is drawn from the rotor 144 and is transferred to the shaft 118 of the gas generator 112 which consequently increases advantageously the rate of acceleration of the turbine engine 110.

As shown in FIG. 2, the turbine engine 110 further includes deceleration assistance means in accordance with the invention making it possible to increase advantageously the rate of deceleration of the turbine engine, which includes a second electricity generator 146 coupled to a shaft 118 of the gas generator 112, and a second electric motor 148 that is connected to the shaft 142 of the rotor 144.

When it is actuated, the second electricity generator 146 draws a quantity of rotational kinetic energy from the shaft 118 of the gas generator in order to transform it into electrical energy. This electrical energy is transmitted to the second electric motor 148 that then transforms it into mechanical energy in order to transmit it to the shaft 142 of the rotor 144.

It can thus be understood that, in the invention, during a deceleration stage, the energy drawn from the gas generator shaft 112 is advantageously stored in the rotor 144 in the form of rotational kinetic energy and may be advantageously re-used in order to actuate the first electric motor during a stage of turbine engine acceleration.

Preferably, the first motor 130 and the second generator 146 constitute a single device, namely a first motor/generator 150, and the first generator 140 and the second motor 148 preferably also constitute a single electric device, namely a second motor/generator 152, each of the motor/generators being a motor that is capable of operating as a generator.

A third embodiment of a turbine engine 210 in accordance with the present invention is described below with reference to FIG. 3.

In this figure, any element that is identical to an element shown in FIG. 1 has the same numerical reference plus 200.

Similarly to the first embodiment, the turbine engine 210 comprises a gas generator 212 provided with a shaft 218 and a free turbine 214 having a shaft 216.

In accordance with the invention, the turbine engine 210 comprises a hydraulic auxiliary motor 260 coupled to a shaft 218 of the gas generator 212, which motor is intended to provide a quantity of rotational kinetic energy to the shaft 218 of the gas generator 212 during a stage of turbine engine acceleration 212.

This motor 260 may be powered by a hydraulic source placed in the helicopter, e.g. by a first pump 262 coupled to a shaft 216 of the free turbine 214, or any other storage device, preferably a hydraulic pressure accumulator 261.

In this embodiment, the turbine engine 210 further and preferably includes deceleration assistance means comprising a second hydraulic pump coupled to the shaft 218 of the gas generator 212, this second pump being intended for drawing a quantity of kinetic energy from the shaft 218 of the gas generator in such a manner as to increase the level of deceleration of the turbine engine 210. Preferably, the second hydraulic pump is constituted by the hydraulic motor 260 operating in inverse mode, i.e. as a pump. Thus, it can be understood that the hydraulic pump is equivalent to a hydraulic "generator". The energy drawn off is thus capable of being stored in the form of hydraulic energy in the brake hydraulic pressure accumulator 261.

The invention claimed is:

1. A turbine engine of an aircraft, comprising:
a gas generator and a free turbine driven in rotation by the gas flow generated by the gas generator;
a first electricity generator coupled to a shaft of the free turbine;
a storage unit electrically connected to the first electricity generator; and
an electric motor/generator electrically connected to the storage unit and mechanically coupled to a shaft of the gas generator,
wherein the shaft of the free turbine is coupled to a rotor of a helicopter,
wherein the storage unit supplies power to the motor/generator during a stage of turbine engine acceleration to provide a quantity of additional rotational kinetic energy to the gas generator shaft and stores a quantity of kinetic energy drawn from the gas generator shaft by the motor/generator in a form of electrical energy during a stage of turbine engine deceleration, and
wherein the storage unit is recharged by the first electricity generator.

2. A turbine engine according to claim 1, further comprises a converter and an electronic control device that are positioned between the motor/generator and the storage unit.

3. A turbine engine according to claim 1, wherein the storage unit is an electric battery, or a group of supercapacitors, or a combination of both.

4. A turbine engine according to claim 1, wherein the motor/generator starts the gas generator while starting the turbine engine.

5. A turbine engine of an aircraft, comprising:
a gas generator and a free turbine driven in rotation by the gas flow generated by the gas generator;
a first electricity generator coupled to a shaft of the free turbine;
a storage unit electrically connected to the first electricity generator;
an electric motor/generator electrically connected to the storage unit and mechanically coupled to a shaft of the gas generator; and
a converter and an electronic control device positioned between and electrically connected to the motor/generator and the storage unit,
wherein the shaft of the free turbine is coupled to a rotor of a helicopter,
wherein the storage unit supplies power to the motor/generator during a stage of turbine engine acceleration to provide a quantity of additional rotational kinetic energy to the gas generator shaft and stores a quantity of kinetic energy drawn from the gas generator shaft by the motor/generator in a form of electrical energy during a stage of turbine engine deceleration,
wherein the storage unit is recharged by the first electricity generator, and
wherein the motor/generator starts the gas generator while starting the turbine engine.

6. A turbine engine according to claim 5, wherein the storage unit is an electric battery, or a group of supercapacitors, or a combination of both.

7. A turbine engine according to claim 1, further comprising a second motor/generator that includes the first electricity generator, the second motor/generator is coupled to a shaft of the rotor, and wherein the motor/generator includes a second electricity generator.

8. A turbine engine according to claim 5, further comprising a second motor/generator that includes the first electricity generator, the second motor/generator is coupled to a shaft of the rotor, and wherein the motor/generator includes a second electricity generator.

* * * * *